(12) United States Patent
Artman et al.

(10) Patent No.: US 10,162,963 B2
(45) Date of Patent: Dec. 25, 2018

(54) MALWARE DETECTION AND IDENTIFICATION USING DEVIATIONS IN ONE OR MORE OPERATING PARAMETERS

(71) Applicant: Lenovo Enterprise Solutions (Singapore) Pte. Ltd., Singapore (SG)

(72) Inventors: Paul Artman, Cary, NC (US); Gary D. Cudak, Wake Forest, NC (US); Tristian T. Brown, Raleigh, NC (US); Christopher L. Wood, Chapel Hill, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 167 days.

(21) Appl. No.: 15/084,666

(22) Filed: Mar. 30, 2016

(65) Prior Publication Data

US 2017/0286670 A1    Oct. 5, 2017

(51) Int. Cl.
*G06F 21/00*    (2013.01)
*G06F 21/55*    (2013.01)
*G06F 21/56*    (2013.01)

(52) U.S. Cl.
CPC .......... *G06F 21/552* (2013.01); *G06F 21/566* (2013.01)

(58) Field of Classification Search
CPC .............................. G06F 21/552; G06F 21/566
USPC ...................................... 726/22–25
See application file for complete search history.

(56) References Cited

U.S. PATENT DOCUMENTS

2004/0205419 A1* 10/2004 Liang .................... G06F 21/552
714/57
2014/0157405 A1*  6/2014 Joll ..................... H04L 63/1425
726/22

* cited by examiner

*Primary Examiner* — Anthony D Brown
(74) *Attorney, Agent, or Firm* — Jeffrey L. Streets (57) ABSTRACT

A method is provided for detecting malware, such as a virus or spyware. The method looks for deviations expected operating parameters instead of focusing solely on conventional malware signatures. The method includes monitoring current operating parameters for a computing system running one or more application, obtaining baseline operating parameters for the computing system running the one or more application in the absence of malware, identifying a deviation between the current operating parameters and the baseline operating parameters, and determining whether the identified deviation matches a deviation associated with a predetermined malware definition.

18 Claims, 5 Drawing Sheets

Marginal Baseline Operating Parameters — Compute Node 1

| Application | State | Processor Utilization (%) | Memory Utilization (%) | I/O Utilization (%) |
|---|---|---|---|---|
| A | Open | 25 | 15 | 5 |
| B | Open | 25 | 30 | 15 |
| C | Open | 50 | 40 | 25 |
|   | Minimized | 10 | 10 | 5 |
| D | Open | 20 | 30 | 40 |
|   | Minimized | 5 | 10 | 10 |
| E | Open | 25 | 30 | 30 |
|   | Minimized | 5 | 10 | 0 |

Malware Definitions

| Malware Name/ID | Type | Signature Code | Processor Deviation (%) | Memory Deviation (%) | I/O Deviation (%) |
|---|---|---|---|---|---|
| MW1 | Virus |  | 40 | 10 | 5 |
| MW2 | Spyware |  | 10 | 15 | 30 |
| MW3 | Virus |  | 25 | 25 | 10 |
| MW4 | Adware |  | 15 | 15 | 20 |

Calculation of Current Baseline Operating Parameters
(Compute Node 1 Running Applications C and E)

| Running Applications | State | Processor Utilization (%) | Memory Utilization (%) | I/O Utilization (%) |
|---|---|---|---|---|
| C | Open | 50 | 40 | 25 |
| E | Minimized | 5 | 10 | 0 |
| Total | | 55 | 50 | 25 |

Calculation of Deviation Between
Current and Baseline Operating Parameters

| | Processor Utilization (%) | Memory Utilization (%) | I/O Utilization (%) |
|---|---|---|---|
| Current Measured Operating Parameters | 80 | 75 | 35 |
| Current Baseline Operating Parameters | 55 | 50 | 25 |
| Deviation | 25 | 25 | 10 |

111
MALWARE DETECTION AND IDENTIFICATION USING DEVIATIONS IN ONE OR MORE OPERATING PARAMETERS

BACKGROUND

Field of the Invention

The present invention relates to methods of detecting malware on a computer.

Background of the Related Art

Malicious software, known as malware, is any software that was prepared with a malicious intent to take actions against the objectives of a compute owner or administrator. The term "malware" includes, without limitation, computer viruses, worms, Trojan horses, ransomware, spyware, adware, and scareware. Some malware is hidden in legitimate files to avoid detection.

Current malware and virus detection systems rely on comparing files to definitions or signatures of known viruses or malware. When a file is found to include code that matches one of the signatures, a user may be notified and the file may be quarantined or deleted. However, as a computer file system grows, there is a substantial increase in the length of time and system resources it takes to scan all the files. At a certain point, these scans may hinder usage of a system.

BRIEF SUMMARY

One embodiment of the present invention provides a method comprising monitoring current operating parameters for a computing system running one or more application, obtaining baseline operating parameters for the computing system running the one or more application in the absence of malware, identifying a deviation between the current operating parameters and the baseline operating parameters, and determining whether the identified deviation matches a deviation associated with a predetermined malware definition.

Another embodiment of the present invention provides a computer program product comprising a non-transitory computer readable storage medium having program instructions embodied therewith, wherein the program instructions are executable by a processor to cause the processor to perform a method The method comprises monitoring current operating parameters for a computing system running one or more application, obtaining baseline operating parameters for the computing system running the one or more application in the absence of malware, identifying a deviation between the current operating parameters and the baseline operating parameters, and determining whether the identified deviation matches a deviation associated with a predetermined malware definition.

DETAILED DESCRIPTION

One embodiment of the present invention provides a method comprising monitoring current operating parameters for a computing system running one or more application, obtaining baseline operating parameters for the computing system running the one or more application in the absence of malware, identifying a deviation between the current operating parameters and the baseline operating parameters, and determining whether the identified deviation matches a deviation associated with a predetermined malware definition.

Operating parameters for a computing system may, without limitations, include a measure of responsiveness of one or more of the applications running on the computing system or a measure of overall utilization of the computing system. For example, the operating parameters for the computing system may include a utilization value for a plurality of components of a computing system, wherein the computing system may be an individual compute node or a plurality of connected compute nodes. In one option, the operating parameters for a compute node may include a processor utilization, a memory utilization, an input/output (I/O) utilization, or combinations thereof. Preferably, the data associated with the operating parameters will identify a state of each of the one or more applications at the time that the operating parameters are measured. Other operating conditions, such as what website an open browser application is accessing, may be further specified in order to adequately characterize the conditions in which the operating parameters are measured.

Baseline operating parameters are preferably obtained by measuring the operating parameters during an initial usage of the one or more application on the computing system, where the objective is to measure the operating parameters resulting solely from the processing of the one or more applications in the absence of any malware. In one option, the operating parameters for the computing system may identify marginal operating parameters for a plurality of applications that may be simultaneously run on the computing system. Accordingly, the baseline operating parameters for the computing system running multiple applications is the sum of the marginal operating parameters for each of the multiple applications. As described herein, current operating parameters that deviate from the baseline operating parameters may indicate that malware is running on the computing system.

When malware is detected on a computing system, perhaps by scanning the computing system for conventional malware signatures, the method may identify and store any deviation associated with the malware. In other words, the deviation in utilization above the baseline utilization attributable to the applications running on the computing system is stored in association with a malware identifier or a malware definition. A malware definition may already include a malware identifier and a malware signature, but the identified deviation may be added to, or otherwise associated with, the malware definition. The method may further include distributing the malware definition to another computing system, wherein the malware definition includes the identified deviation in operating parameters. Accordingly, embodiments of the present invention include a computing system utilizing such malware definitions, which include operating parameter deviation data, without participating in the development of the malware definitions.

The step of determining whether the identified deviation matches a deviation associated with a malware definition, may include comparing the identified deviation with each deviation associated with one of a plurality of malware definitions. In other words, each of a plurality of malware definitions includes an associated deviation as described above. A currently identified deviation is compared against each of the malware definitions to look for a match. A match may be concluded without an exactly equivalent utilization. For example, a user may specify some measure of similarity that should be considered a match. A measure of similarity may be an absolute or percentage range, or a standard deviation. Alternatively, the measure of similarity may be a determination that the identified deviation more closely matches the operating parameter deviations of one of the malware definitions than any of the other malware definitions. Furthermore, the operating parameters or the deviations in operating parameters may be averages measured over a period of time, such that instantaneous fluctuations in the operating parameters do not cause false determinations.

In a further embodiment, the use of the identified deviation to identify a malware definition may be a preliminary step to scanning the computing system for malware. According to one option, the method may identify one of the malware definitions that is associated with a deviation matching the identified deviation, and then scan the computing system for malware consistent with the identified malware definition. Therefore, the deviations are used as the basis for initiating a targeted malware scan that prioritizes the search for files affected with the identified malware definition. Accordingly, the malware scan uses fewer system resources and takes less time than a conventional malware scan that looks for any and all available malware definitions. Optionally, the method may identify multiple malware definitions each having an associated deviation that more closely matches the identified deviation than the deviations associated with other malware definitions, and scan the computing system for malware consistent with the multiple identified malware definitions. Even though the scan may look for multiple malware definitions, the scan uses fewer malware definitions than a convention malware scan that looks for any and all available malware definitions.

In another option, the method may further includes generating a notification that identifies the identified deviation in operating parameters and any matching malware, and sending the notification to a management system or system administrator. Accordingly, the management system or system administrator may determine the best course of action.

Another embodiment of the present invention provides a computer program product comprising a non-transitory computer readable storage medium having program instructions embodied therewith, wherein the program instructions are executable by a processor to cause the processor to perform a method The method comprises monitoring current operating parameters for a computing system running one or more application, obtaining baseline operating parameters for the computing system running the one or more application in the absence of malware, identifying a deviation between the current operating parameters and the baseline operating parameters, and determining whether the identified deviation matches a deviation associated with a predetermined malware definition.

The foregoing computer program products may further include program instructions for implementing or initiating any one or more aspects of the methods described herein. Accordingly, a separate description of the methods will not be duplicated in the context of a computer program product.

Figure 1:
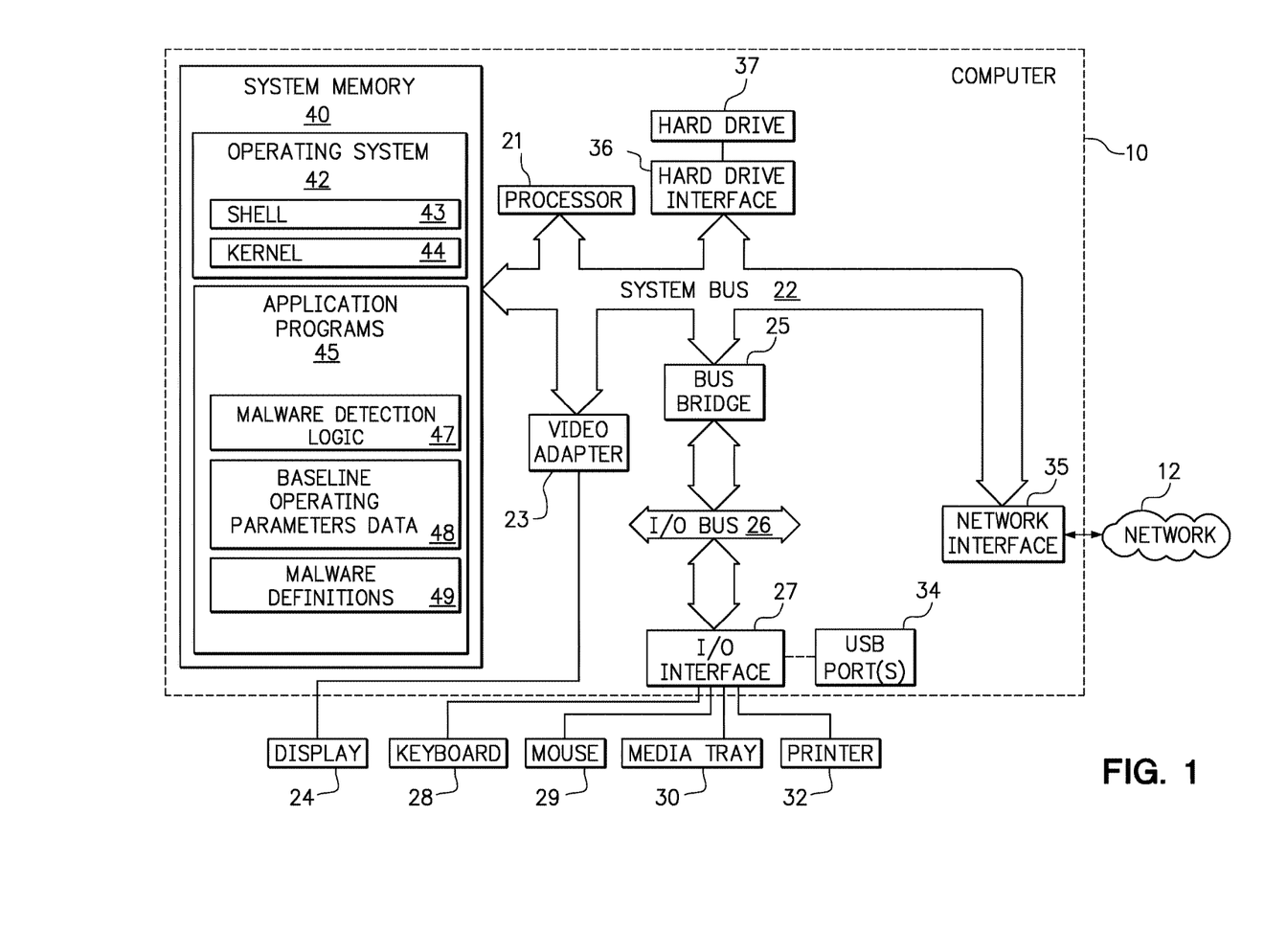
FIG. 1 is a diagram of a computer that may be used consistent with embodiments of the present invention.

FIG. 1 is a diagram of a compute node or server 10 that is capable of implementing the methods of the present invention. In this non-limiting example, the compute node 10 includes a processor unit 21 that is coupled to a system bus 22. The processor unit 21 may utilize one or more processors, each of which has one or more processor cores. A video adapter 23, which drives/supports a display 24, is also coupled to the system bus 22. The system bus 22 is coupled via a bus bridge 25 to an input/output (I/O) bus 26. An I/O interface 27 is coupled to the I/O bus 26 and provides communication with various I/O devices, including a keyboard 28, a mouse 29, a media tray 30 (which may include storage devices such as CD-ROM drives, multi-media interfaces, etc.), a printer 32, and USB port(s) 34. As shown, the compute node 10 is able to communicate with other network devices, such as a management node or another compute node, via the network 12 using a network adapter or network interface controller 35.

A hard drive interface 36 is also coupled to the system bus 22. The hard drive interface 36 interfaces with a hard drive 37. In a preferred embodiment, the hard drive 37 communicates with system memory 40, which is also coupled to the system bus 22. System memory includes the lowest level of volatile memory in the compute node 20. This volatile memory may include additional higher levels of volatile memory (not shown), including, but not limited to, cache memory, registers and buffers. Data that populates the system memory 40 includes the operating system (OS) 42 and application programs 45.

The operating system 42 includes a shell 43 for providing transparent user access to resources such as application programs 45. Generally, the shell 43 is a program that provides an interpreter and an interface between the user and the operating system. More specifically, the shell 43 executes commands that are entered into a command line user interface or from a file. Thus, the shell 43, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 44) for processing. Note that while the shell 43 is a text-based, line-oriented user interface, the present invention will equally well support other user interface modes, such as graphical, voice, gestural, etc.

As depicted, the operating system 42 also includes the kernel 44, which includes lower levels of functionality for the operating system 42, including providing essential services required by other parts of the operating system 42 and application programs 45, including memory management, process and task management, disk management, and mouse and keyboard management. The application programs 45 in the system memory of the compute node 20 may include, without limitation, malware detection logic 47, baseline operating parameters data 48, and malware definitions 49 in accordance with various embodiments of the present invention. One example of the malware detection logic 47 is the method of FIG. 7.

The hardware elements depicted in the compute node 10 are not intended to be exhaustive, but rather are representative. For instance, the compute node 10 may include alternate memory storage devices such as magnetic cassettes, digital versatile disks (DVDs), Bernoulli cartridges, and the like. These and other variations are intended to be within the scope of the present invention. Furthermore, the structure of the computer 10 is representative of various nodes or computing systems disclosed herein. For example, the computer 10 may be a stand-alone computer, or either a compute node or a management node in a computing system that includes a management node and a plurality of compute nodes.

Figure 2:
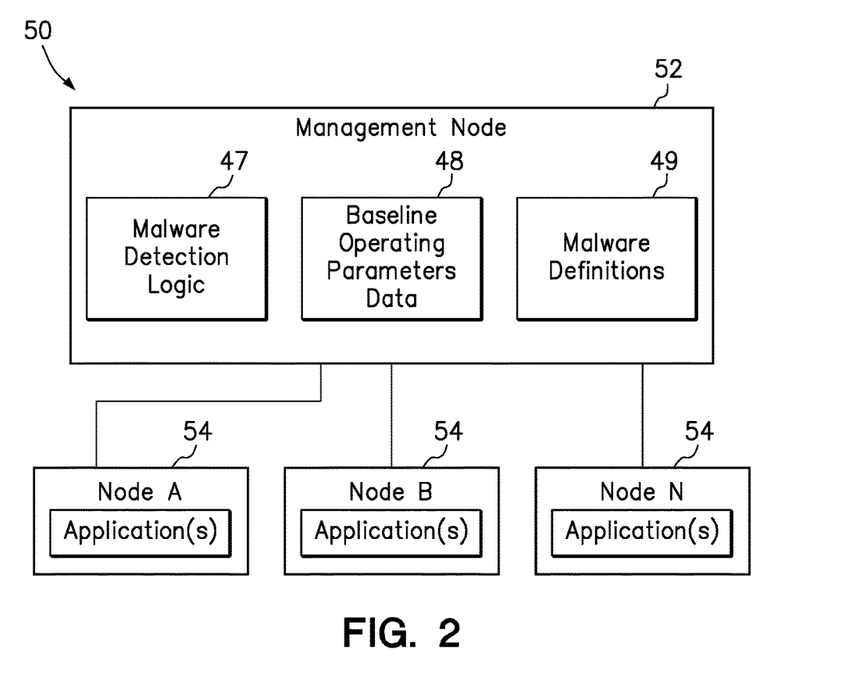
FIG. 2 is a diagram of a computing system that may be used according to embodiments of the present invention.

FIG. 2 is a diagram of a computing system 50 that may be used according to embodiments of the present invention. The computing system 50 includes a management node 52 and a plurality of compute nodes 54, which may each have a structure consistent with the computer 10 of FIG. 1. However, as shown, the management node 52 includes malware detection logic 47, baseline operating parameters data 48, and malware definitions 49. Each of the compute nodes 54 runs one or more applications 56 and reports those running applications and operating parameters to the management node 52. Accordingly, the management node 52 executed the malware detection logic 47 to identify malware on any of the compute nodes 54.

Figure 3:
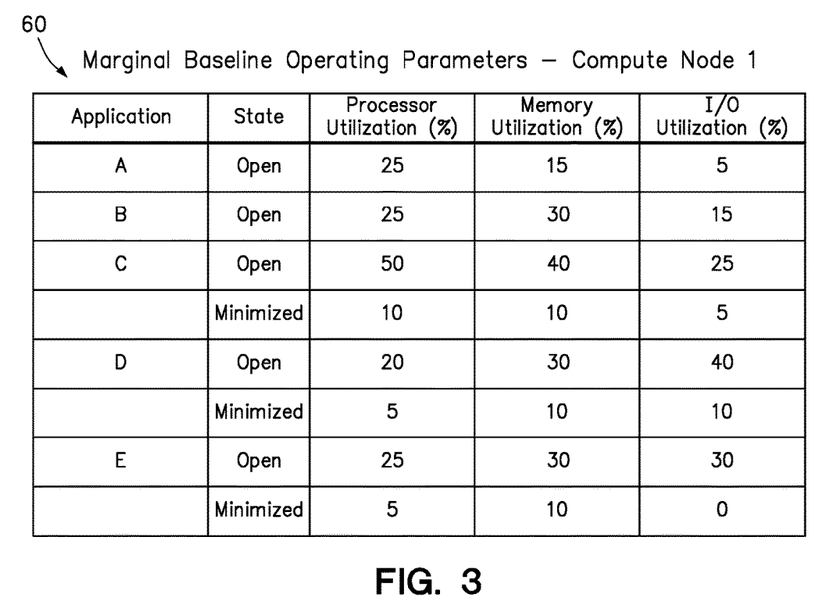
FIG. 3 is a table illustrating marginal baseline operating parameters for a compute node.

FIG. 3 is a table 60 illustrating marginal baseline operating parameters for a compute node. In this non-limiting example, the table includes a plurality of records (rows) that identify an application, a state of the application, and the resulting baseline operating parameters associated with the application in the identified state. For example, when application C is in the "open" state (i.e., running and not minimized), the marginal baseline operating parameters include a processor utilization of 50%, a memory utilization of 40% and an I/O utilization of 25%. By contrast, when the application C is in the "minimized" state (i.e., running but minimized), then the marginal baseline operating parameters are generally reduced, such as a processor utilization of 10%, a memory utilization of 10% and an I/O utilization of 5%. A "marginal" baseline operating parameter identifies the amount that a baseline operating parameter will increase as a result of the identified application running in the identified state. Whereas a "total" baseline operating parameter would identify the total utilization when the identified application is running in the identified state, the use of marginal values facilitates determinations of the baseline operating parameters when various combinations of applications and applications states are being run at the same time. The "baseline" operating values are measured under conditions in which it is known that no malware exists on the compute node.

Figure 4:
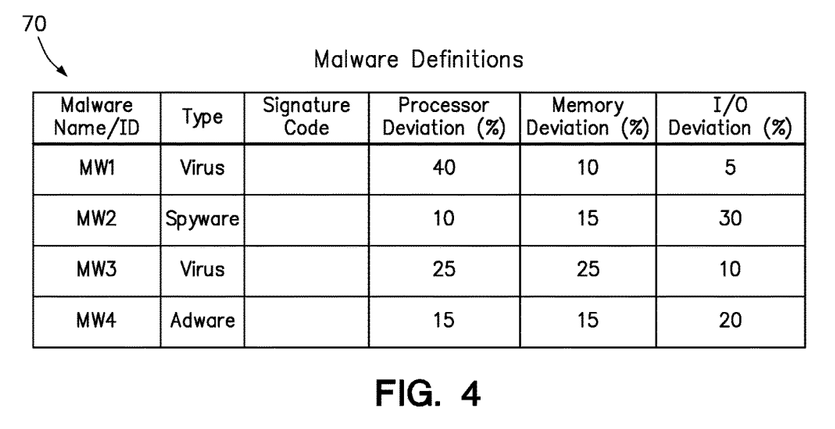
FIG. 4 is a table illustrating malware definitions.

FIG. 4 is a table 70 illustrating malware definitions. While a conventional malware definition may include a malware name or identifier, a malware type, and signature code that characterizes the malware, embodiments of the present invention provide malware definitions that identify deviations in compute node operating parameters that result from the presence of the malware. In this example, the table identifies four different malware definitions (one per row) that each include a processor deviation, memory deviation and an I/O deviation. The "deviation" is the amount of utilization that will increase as a result of the operation of the malware.

Figure 5:
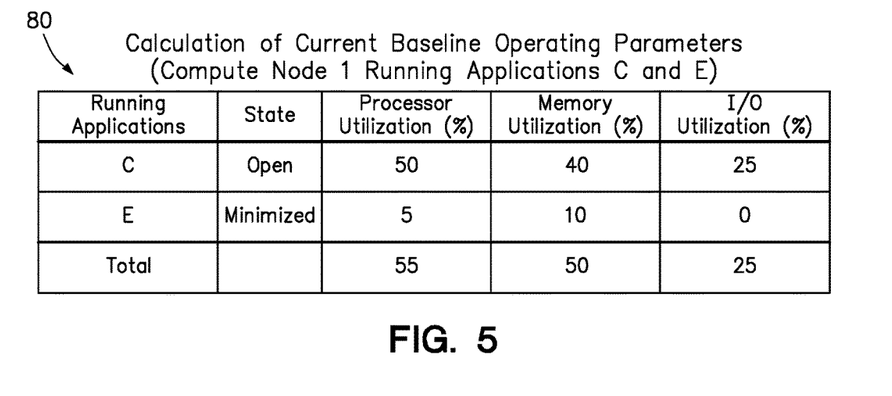
FIG. 5 is a table illustrating a calculation of current baseline operating parameters for a compute node running certain applications.

FIG. 5 is a table 80 illustrating a calculation of current baseline operating parameters for a compute node running certain applications. Assuming that the compute node (Compute Node 1) is running Application C in an open state and Application E in a minimized state, the associated marginal baseline operating parameters are obtained (see FIG. 3) and added together to determine current total baseline operating parameters. Specifically, Compute Node 1 running Application C in an open state and Application E in a minimized state are expected to cause a processor utilization of 55%, a memory utilization of 50% and an I/O utilization of 25%.

Figure 6:
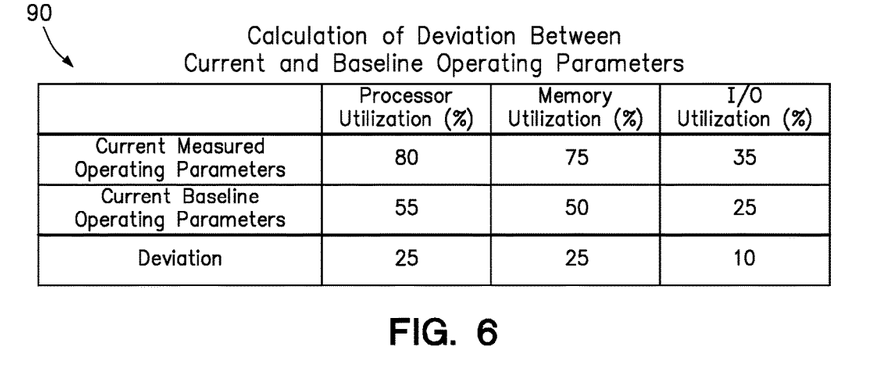
FIG. 6 is a table illustrating a calculation of a deviation between current and baseline operating parameters.

FIG. 6 is a table 90 illustrating a calculation of a deviation between current and baseline operating parameters. The current baseline operating parameters (see FIG. 5) are subtracted from current measured operating parameters of the Compute Node 1 in order obtain a processor deviation of 35%, a memory deviation of 25% and an I/O deviation of 10%. These deviations may be compared with the deviations in each of the malware definitions (see FIG. 4) in order to determine whether any of the malware definitions match the deviation calculated (per FIG. 6). In this example, the deviation matches the malware definition for the virus MW3. While the values used in this example are an exact match, user settings may allow a user to specify how closely a deviation must meet the malware definitions to be declared a match. For example, if a user desired to identify any malware definition that was within 10% utilization of the deviation (25/25/10), then the method would identify both the virus MW3(25/25/10) and the adware MW4 (15/15/20). Accordingly, any subsequent scan might prioritize a search for the malware signatures associated with MW3 and MW4. Time and system resources may be saved by not scanning for MW1 and MW2. Furthermore, the possible presence of malware may be detected during normal use of the compute node to run applications in between, or instead of, periodic conventional malware scans.

Figure 7:
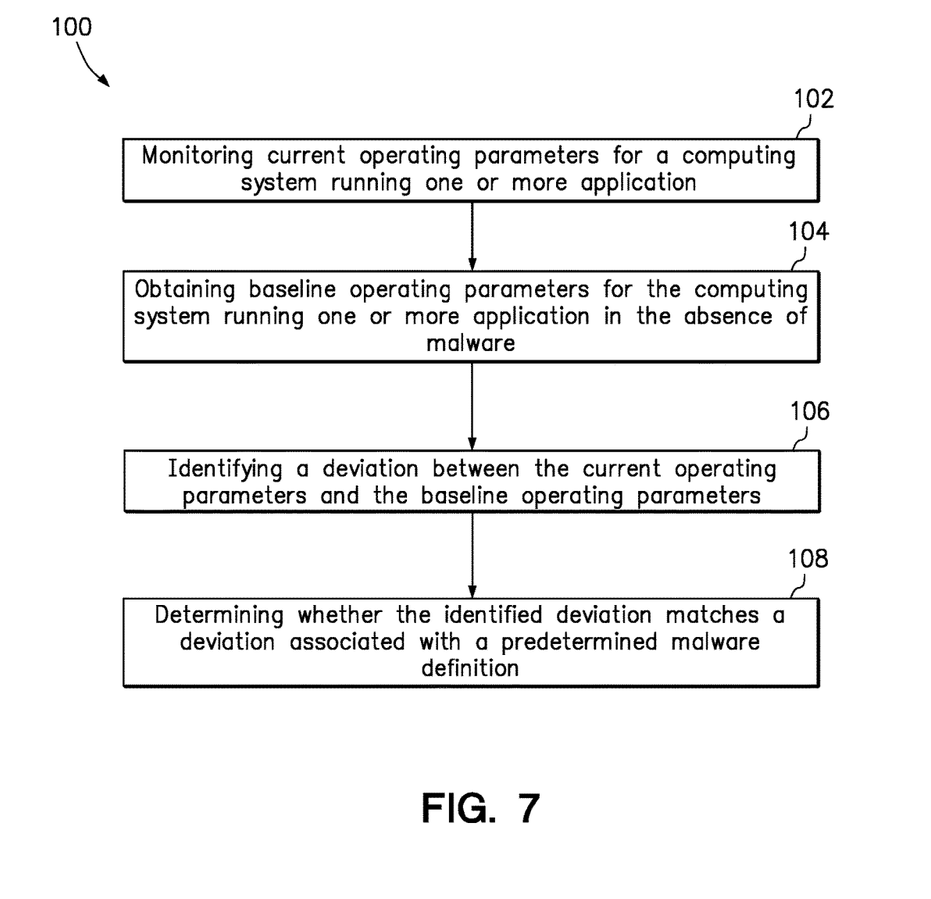
FIG. 7 is a flowchart of a method according to one embodiment of the present invention.

FIG. 7 is a flowchart of a method 100 according to one embodiment of the present invention, which may be implemented by the malware detection logic 47 of FIGS. 1 and 2. The method 100 includes monitoring current operating parameters for a computing system running one or more application (step 102), obtaining baseline operating parameters for the computing system running one or more application in the absence of malware (step 104), identifying a deviation between the current operating parameters and the baseline operating parameters (step 106), and determining whether the identified deviation matches a deviation associated with a predetermined malware definition (step 108).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.)

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by one or more processors, comprising:
    monitoring current operating parameters for a computing system running one or more application, wherein the operating parameters include a measure of overall utilization of a component of the computing system, wherein the component is selected from a processor, memory, an input output device, and combinations thereof;
    identifying a plurality of applications that are currently running on the computing system and marginal baseline operating parameters for each of the identified plurality of applications;
    calculating total baseline operating parameters for the computing system running the identified plurality of applications in the absence of malware, wherein the total baseline operating parameters for the computing system is the sum of the marginal baseline operating parameters for each of the identified plurality of applications;

identifying a deviation between the current operating parameters and the total baseline operating parameters; and determining whether the identified deviation matches a deviation associated with a predetermined malware definition.

2. The method of claim 1, wherein the marginal baseline operating parameters for each of the identified plurality of applications are obtained by measuring the operating parameters of the computing system during an initial usage of the application on the computing system.

3. The method of claim 1, wherein the operating parameters include a measure of responsiveness of the identified plurality of applications running on the computing system.

4. The method of claim 1, wherein the operating parameters identify a state of each of the plurality of applications.

5. The method of claim 1, further comprising:
storing the identified deviation in association with a malware identifier.

6. The method of claim 1, further comprising:
storing the identified deviation in association with a malware definition.

7. The method of claim 6, further comprising:
distributing the malware definition to another computing system, wherein the malware definition includes the identified deviation in operating parameters.

8. The method of claim 1, wherein determining whether the identified deviation matches a deviation associated with a malware definition, includes comparing the identified deviation with each deviation associated with one of a plurality of malware definitions.

9. The method of claim 8, further comprising:
identifying one of the malware definitions that is associated with a deviation matching the identified deviation; and
scanning the computing system for malware consistent with the identified malware definition.

10. The method of claim 8, further comprising:
identifying multiple malware definitions each having an associated deviation that more closely matches the identified deviation than the deviations associated with other malware definitions; and
scanning the computing system for malware consistent with the multiple identified malware definitions.

11. The method of claim 10, wherein the computing system is scanned for malware consistent with the multiple identified malware definitions prior to scanning for malware consistent with other malware definitions.

12. The method of claim 1, further comprising:
generating a notification that identifies the identified deviation in operating parameters and any matching malware; and
sending the notification to a management system or system administrator.

13. A computer program product comprising a non-transitory computer readable storage medium having program instructions embodied therewith, the program instructions executable by a processor to:
monitor current operating parameters for a computing system running one or more application, wherein the operating parameters include a measure of overall utilization of a component of the computing system, wherein the component is selected from a processor, memory, an input output device, and combinations thereof;
identify a plurality of applications that are currently running on the computing system and marginal baseline operating parameters for each of the identified plurality of applications;
calculate total baseline operating parameters for the computing system running the identified plurality of applications in the absence of malware, wherein the total baseline operating parameters for the computing system is the sum of the marginal baseline operating parameters for each of the identified plurality of applications;
identify a deviation between the current operating parameters and the total baseline operating parameters; and
determine whether the identified deviation matches a deviation associated with a predetermined malware definition.

14. The computer program product of claim 13, wherein the marginal baseline operating parameters for each of the identified plurality of applications are obtained by measuring the operating parameters of the computing system during an initial usage of the application on the computing system.

15. The computer program product of claim 13, the program instructions further executable by a processor to:
store the identified deviation in association with a malware definition; and
distribute the malware definition to another computing system, wherein the malware definition includes the identified deviation in operating parameters.

16. The computer program product of claim 13, wherein the program instructions executable by a processor to determine whether the identified deviation matches a deviation associated with a malware definition, include program instructions executable by a processor to compare the identified deviation with each deviation associated with one of a plurality of malware definitions, the program instructions further executable by a processor to:
identify one of the malware definitions that is associated with a deviation matching the identified deviation; and
scan the computing system for malware consistent with the identified malware definition.

17. The computer program product of claim 13, wherein the program instructions executable by a processor to determine whether the identified deviation matches a deviation associated with a malware definition, include program instructions executable by a processor to compare the identified deviation with each deviation associated with one of a plurality of malware definitions, the program instructions further executable by a processor to:
identify multiple malware definitions each having an associated deviation that more closely matches the identified deviation than the deviations associated with other malware definitions; and
scan the computing system for malware consistent with the multiple identified malware definitions.

18. The computer program product of claim 13, wherein the operating parameters identify a state of each of the plurality of applications.

* * * * *